Patented July 17, 1951

2,560,615

UNITED STATES PATENT OFFICE 2,560,615

METHOD OF TEMPERING WHEAT

Benjamin R. Warner, Chicago, Ill., assignor to Guardite Corporation, a corporation of Delaware No Drawing. Application June 18, 1948, Serial No. 33,921

8 Claims. (Cl. 99—80)

This invention relates to a method of tempering wheat, and more particularly to an improved vacuum treatment for moistening wheat or other grains.

The present invention is an improvement upon the method of Merriam and Wiles Patent 2,080,179 and Baer Patent 2,220,880. These prior patents teach the steps of removing air from a bulk product, such as wheat or other grains, by causing boiling of water at ambient temperature from the grain so that the air is replaced by an atmosphere of steam at low pressure, with subsequent steaming to supply moisture and preceded, in the case of the Baer patent, by supplying a predetermined amount of water to the surface of the grain.

The present invention is particularly adapted to certain types and varieties of grain, particularly wheat, to which liquid water does not adhere to the extent desired.

In the present process grain, such as dry wheat, is introduced to a vacuum chamber at ambient temperature which is normally in the neighborhood of 70° F. This may, of course, vary from considerably lower readings in wheat fresh from the elevator in winter time and in summer time. Regardless of the ambient temperature, however, the chamber is then evacuated until water has boiled therefrom in sufficient quantity to scavenge air from the chamber. If the chamber is well filled with grain and the grain is not unusually dry, there is no need for outside steam. Depending upon the amount of air in the chamber, and the amount of moisture in the grain, evacuation is continued until the temperature of the grain has dropped from 5–15° F. in order to insure a substantially air free atmosphere. In practice this usually means a pressure of 0.2 inch of mercury absolute.

Steam is then introduced to the chamber to raise the pressure substantially. The steam should be substantially saturated and the temperature should not be raised above a point where the grain will be injured within the heating period. Normally the pressure may be raised to about 10 inches of mercury absolute which corresponds to approximately 160° F. During the steaming operation steam condenses on and within the cold wheat and increases the moisture content of the wheat throughout.

After the wheat has been steamed sufficiently to warm it to the desired temperature, liquid water is introduced in a predetermined quantity. This quantity is somewhat greater than the amount by which the moisture content of the grain is to be increased, the amount being determined by the formula set forth in Baer Patent 2,220,880.

For certain types of wheat it is preferred to add water at substantially the temperature of the wheat. On the other hand, the use of cooler water, where possible, has the advantage that it may be used to cool the wheat rapidly and thereby reduce the load upon the evacuating equipment.

Following the introduction of the water, whether warm or cool, evacuation is continued until the grain has cooled to the desired temperature. Normally this will be in the neighborhood of 100° F.

In some instances a second steaming evacuation cycle may be carried out if there are any indications or evidence of non-uniformity in moistening.

When the grain has been properly moistened and cooled to the desired final temperature, atmospheric air is admitted to the chamber.

While wheat has been particularly mentioned, the process is applicable to other grains, such as corn, oats, barley, rye and the like.

The foregoing detailed description is given for clearness of understanding only, and no unnecessary limitations should be understood therefrom, for some modifications will be obvious to those skilled in the art.

What I claim is new and desire to secure by Letters Patent is:

1. A method of moistening grain comprising freeing the grain from air and supplying an atmosphere of steam thereto under sub atmospheric pressure, increasing the pressure by supplying additional steam thereto, supplying liquid water to the surface of the grain in a predetermined amount after said pressure increase, then subjecting the grain to an increased vacuum and thereafter supplying atmospheric air thereto.

2. The method as set forth in claim 1 in which the atmosphere of steam is supplied under decreasing pressure and the pressure of steam is thereafter increased to produce a temperature in excess of 100° F.

3. The method as set forth in claim 2 in which the steam pressure is increased to bring the temperature to about 160° F. prior to the addition of liquid water.

4. The method as set forth in claim 1 in which the liquid water is introduced at a temperature substantially below the temperature of the grain.

5. The method as set forth in claim 1 in which the grain after the introduction of liquid water, is subjected to evacuation sufficient to cool the grain, then to an increased pressure of steam, then to a further evacuation, after which atmospheric air is supplied.

6. The method as set forth in claim 1 in which the pressure does not exceed atmospheric throughout the process.

7. The method of handling a bulk product containing some moisture, to add free moisture thereto, which comprises subjecting the product to a vacuum sufficiently high to cause boiling of water at ambient temperature whereby an atmosphere of steam is produced under sub atmospheric pressure, supplying additional steam to raise the temperature and pressure, then supplying liquid water in predetermined quantity to wet the surfaces of the product, reducing the pressure on the product to cause further boiling of water, and introducing atmospheric air thereto.

8. The method as set forth in claim 1, in which the liquid water introduced to the grain is at a temperature up to substantially the temperature of the grain.

BENJAMIN R. WARNER.

REFERENCES CITED

The following references are of record in the file of this patent:

UNITED STATES PATENTS

| Number | Name | Date |
| --- | --- | --- |
| 1,920,107 | Richardson | July 25, 1933 |
| 2,220,880 | Baer | Nov. 12, 1940 |
| 2,227,634 | Dalin | Jan. 7, 1941 |